UNITED STATES PATENT OFFICE.

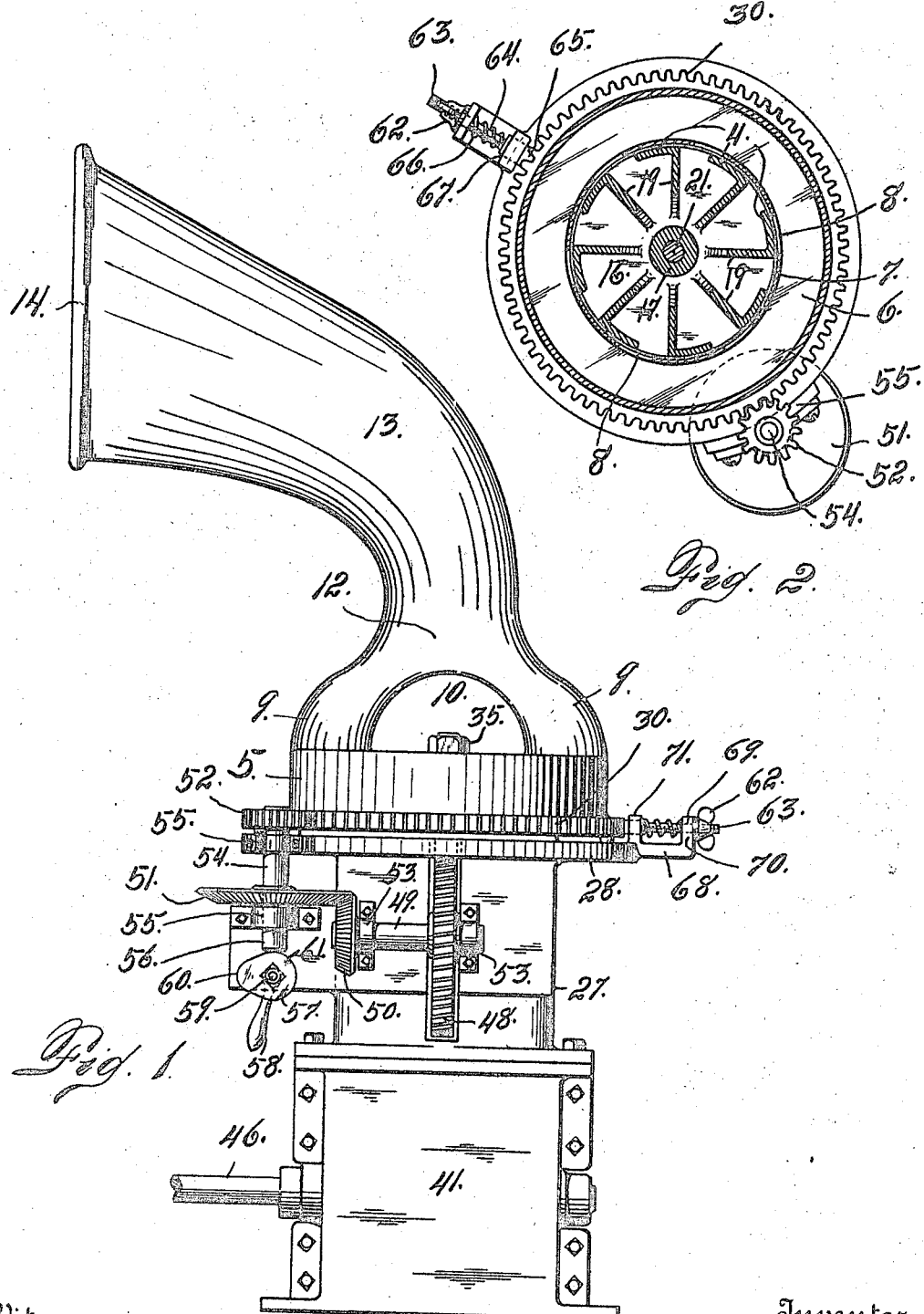

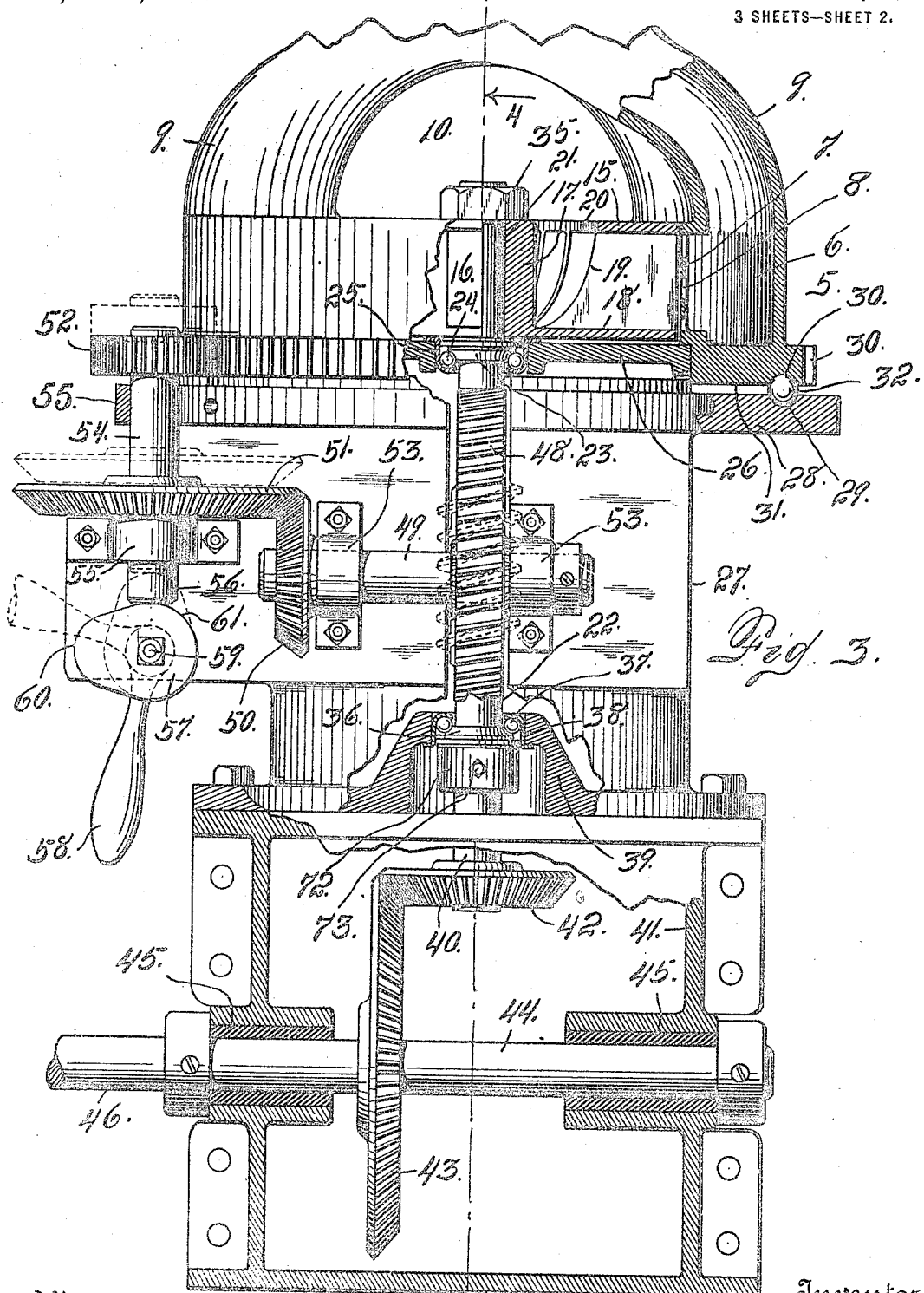

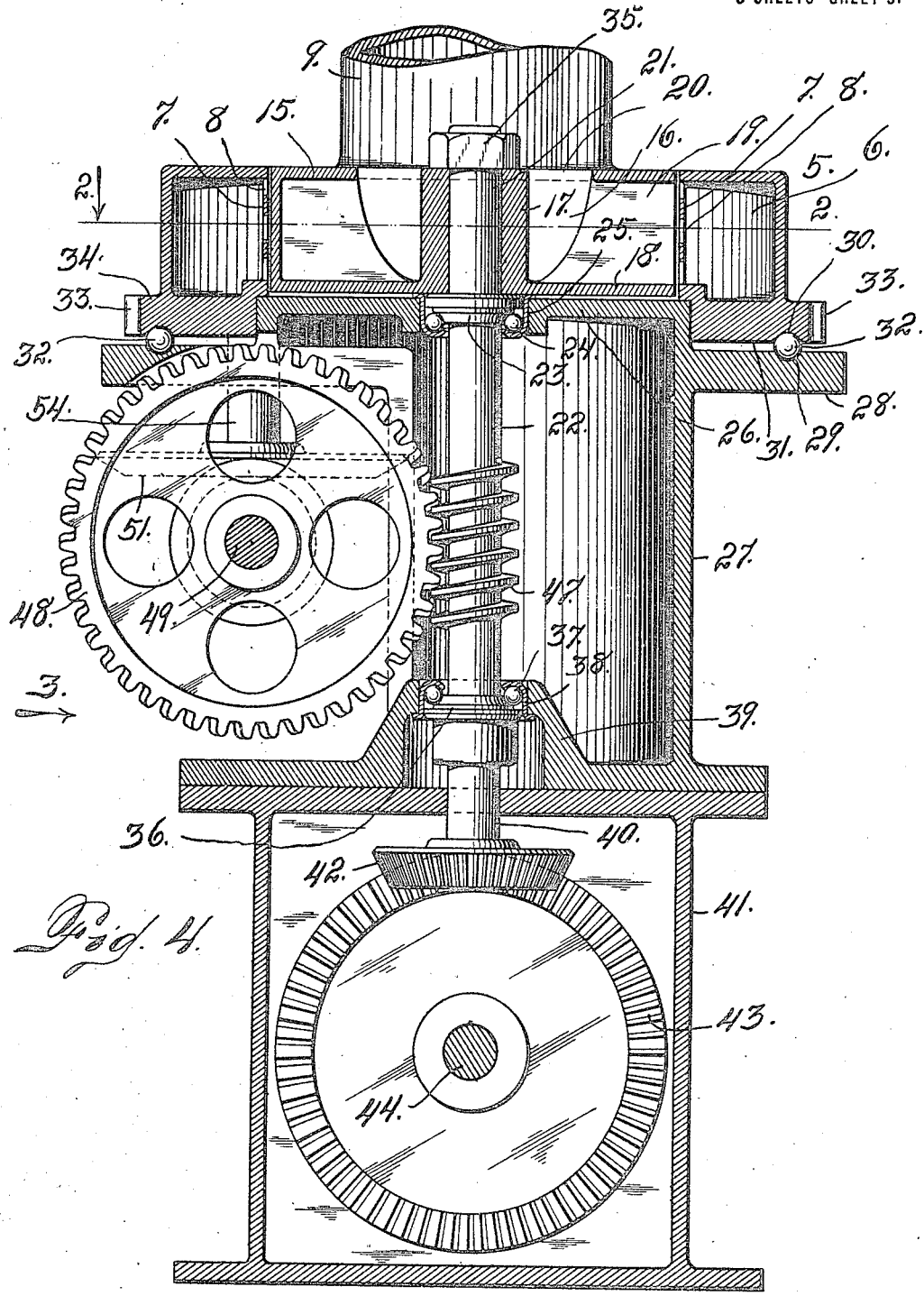
Fig. 4.

CHARLES M. ANDERSON, OF DENVER, COLORADO.

SIREN.

1,208,887.

Specification of Letters Patent. Patented Dec. 19, 1916.

Application filed January 25, 1915. Serial No. 4,373.

*To all whom it may concern:*

Be it known that I, CHARLES M. ANDERSON, a citizen of the United States, residing in the city and county of Denver and State of Colorado, have invented certain new and useful Improvements in Sirens; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in sirens, or instruments adapted to produce peculiar sounds generally of the signaling character, in order to indicate the presence, location or approach of an object, as a ship in a fog. Instruments of this character are also used on land and may be employed to advantage on vehicles employed by fire departments in order to signal the approach thereof, and warn people in the streets, since these vehicles usually go with such rapidity that special warning is necessary. An instrument of this character may also be employed in connection with automobiles or other vehicles or apparatus where a peculiar noise is important for signaling or other purposes.

In my present improvement, I employ a rotor mounted in a cylinder and having blades whose outer edges approach a perforated outer wall through which the air which is drawn into the center of the cylinder which is open for the purpose, is driven into an outer chamber and thence delivered to the horn, which is mounted to rotate slowly with the last named chamber, while the rotor is traveling very rapidly, the outer chamber being connected with the mechanism for operating the rotor through the medium of speed reducing gears. By virtue of this rotary action of the outer chamber and its horn, the sound may be caused to travel in any desired direction, after the location or approximate location of the object, as a vessel to be signaled, has been determined. Hence, provision is made for disconnecting the gear connected with the outer chamber from the operating mechanism and locking the same with the horn in a predetermined position.

Having briefly outlined my improved construction, I will proceed to describe the same in detail, reference being made to the accompanying drawing, in which is illustrated an embodiment thereof.

In this drawing, Figure 1 is an elevation of my improved construction, shown in connection with a motor for operating the same. Fig. 2 is a horizontal section taken on the line 2—2, Fig. 4, looking downwardly, but shown on a reduced scale. Fig. 3 is a side elevation partly in section of the mechanism, shown on a much larger scale than Fig. 1. This is a view looking in the direction of the arrow 3, Fig. 4. Fig. 4 is a vertical section taken on the line 4—4, Fig. 3.

The same reference characters indicate the same parts in all the views.

Let the numeral 5 designate a circular casing inclosing a chamber 6 having an inner wall 7 provided with perforations 8. Communicating with the chamber 6 and extending upwardly therefrom, are two hollow branches 9 which are separated above the casing by a semicircular opening 10. These two branches 9 merge or form a junction at 12, whereby they communicate with a horn 13 which is suitably curved and terminates in an enlarged open extremity 14. Surrounded by the perforated wall 7 is a second chamber 15 in which is located a rotor 16 composed of a hub 17, a bottom 18 and radial fan blades 19. The upper part of this chamber is open as shown at 20 to allow the air to enter in response to the suction produced by the rapid movement of the rotor within its chamber. The hub of the rotor is fitted to the upper portion 21' of a vertically disposed shaft 22 provided with a cone 23 engaging ball bearings 24 located in a ball cup 25 secured to the upper part 26 of a housing 27, which is provided with an exteriorly projecting circumferential flange 28 having a groove 29 in its upper surface, which coöperates with a similar groove 30 in the lower surface of the bottom 31 of the circular casing 5. Engaging the grooves 29 and 30 are balls 32 to relieve the friction during the rotation of the casing 5, which is provided with a relatively large gear 33 formed on the outer edge of the bottom 31 of the circular casing 5, the said bottom projecting beyond the body of the casing as shown at 34 for the purpose.

The hub of the rotor 16 is clamped between a nut 35 applied to the upper extremity of the shaft 22 and the upper surface of the cone 23 formed on said shaft, as heretofore explained, whereby the rotor is secured to rotate with the shaft. The lower part of this shaft is also provided with a cone 36 which engages balls 37 located within a ball cup 38 fast in the lower part 39 of the housing. The lower extremity 40 of this shaft projects beyond the bottom of the housing 27, and extends into a casing 41. The lower end of this shaft is provided with a gear 42 which meshes with a large gear 43 formed on a shaft 44 which is journaled as shown at 45, in the casing 41. The shaft 44 which protrudes from this casing as shown at 46, may be connected with a motor of any desired character. The operation of the shaft 46 should be at such speed as to impart a relatively high speed to the rotor 16 through the medium of the gears 43, 42 and the shaft 22, in order that the action of the rotor within its chamber and its coöperation with the perforated wall 7 surrounding the chamber of the rotor, may produce the neccessary sound for the purposes of an instrument of this character.

Motion is imparted to the circular casing 5, together with the horn 23, at a relatively slow speed, through the medium of a worm 47, a worm wheel 48, a pinion 50, a large gear 41 and a pinion or smaller gear 52. The worm 47 is formed on the shaft 22 and is engaged by the worm wheel 48, which is fast on a shaft 49 journaled in bearings 53 formed on the housing 27. The pinion 50 is fast on the shaft 49 and meshes with the gear 51 which is fast on a shaft 54 journaled in bearings 55 formed on the housing 27. The pinion 52 meshes with the gear 30 of the circular casing 5, as heretofore explained, and imparts to the said casing and the horn 13, the relatively slow travel heretofore explained.

Provision is made for disconnecting the pinion 52 from the gear 30, when for any reason it is desired to stop the rotary action of the horn 13, as for instance, when the location of the vessel or other object toward which the sound is to be directed, has been determined, and it is therefore desirable to continue the sound or the vibrations resulting from the action of the instrument, in the one direction. In order to accomplish this purpose, the lower extremity of the shaft 54 when its pinion 52 is in mesh with the gear 30, extends below its lower bearing 55 as shown at 56, and engages a cam 57 provided with a handle 58 to facilitate its manipulation. Normally, or when the gear 52 is in mesh with the gear 30, the extremity 56 of this shaft engages a portion of the cam nearest the axis 59 thereof. This cam, however, is provided with a projection 60 whose outer face is considerably farther from the cam's axis than the part 61 of the cam normally engaged by the extremity 60 of the shaft, as heretofore explained. Now, when it is desired to disconnect the pinion 52 from the gear 30, the cam is moved from the full line position in Fig. 3 to the dotted line position in the same figure, in which event, the part 60 of the cam will act on the lower extremity of the shaft 54 to lift the said shaft, together with its gears 51 and 52 out of mesh with the gear 30 and pinion 50, respectively, whereby the power which acts to rotate the circular casing 5 will be disconnected. At the same time that this is done, the operator will loosen a wing nut 62 applied to the threaded part 63 of a stop pin 64, having a tooth 65 adapted to pass between two of the cogs or teeth of the gear 30. This pin is surrounded by a spiral spring 66 which acts upon a shoulder 67 of the pin to throw its tooth 65 into mesh with the gear. By turning the nut 62 upon the threaded end of this pin which is mounted on a U-shaped bracket 68, the pin may be actuated to throw its tooth 65 away from the gear. It should be explained that the threaded part 63 of this pin passes through an opening 69 formed in one arm 70 of the said bracket, while the shoulder or enlarged part 67 of the pin passes through an opening formed in the other arm 71 of the bracket. Now, assuming that it is desired to disconnect the pin from the gear, the nut will be turned to withdraw the pin or move it away from the gear. This action will place the spring 66 under tension, since one extremity of this spring engages the shoulder 67 of the pin, while the other extremity engages the arm 69 of the bracket. Assuming that the pin 64 is withdrawn from the gear, as it must be during the rotation of the circular casing 5 and the horn, when it is desired to stop the rotation of these members, the cam 57 will be actuated to disconnect the gears 51 and 52 from their coöperating gears heretofore explained, and the wing nut 62 will be turned to release the pin, whereby the spring 66 by virtue of its recoil, will force the tooth of the pin into mesh with the cogs of the gear.

From the foregoing description, the use and operation of my improved siren will be readily understood. This instrument may be suitably located, as upon the upper deck of a ship, and connected with an electric motor, for instance, similarly located. Now, if it is desired to signal another ship or ships, the motor is set in motion and the rotor 16 rotated at high speed, the horn 13 together with its circular casing being slowly rotated. During all this time, the sound vibrations incident to the operation of the instrument will be emitted from the mouth of the horn at all directions, since the latter is traveling in a circle. Hence, the signal will be of a general character. However, as soon as an answering signal is received, as from another vessel and the direction from which this signal comes is ascertained, the motion of the horn will be stopped by operating the cam 51 and the adjustment of the pin 64, as heretofore explained. Then, as the instrument is operated, the sound vibrations will be discharged in a single direction only, namely, the direction in which the answering ship or vessel is located. The fan blades 19 are provided at their outer extremities with flanges 4 which are curved to conform to the curve of the perforated walls 7, and are of such length as to cover a vertical row of perforations as a blade passes. In this manner, the perforations are alternately closed and opened by the action of the rotor and this rapid discharge of the air through these perforations and the interruption of its passage therethrough, produces a peculiar sound or noise, which is the object of this instrument. The cone 36 of the shaft 22 is formed upon a sleeve 72 which is vertically adjustable upon the shaft by means of a set bolt 73. This special construction is for convenience in mounting the shaft and arranging the ball-bearing construction.

Having thus described my invention, what I claim is,—

1. A device of the class described comprising a casing surrounding an air space, the inner wall of the casing being perforated, a rotor within the air space, the casing being rotatably mounted, an operating shaft upon which the rotor is mounted and a speed reducing connection between the said shaft and the said rotary casing, the latter being equipped with a horn.

2. In combination, a rotary casing surrounding an air space and having its inner wall perforated, a rotor within the air space, a horn mounted on the rotary casing and in communication with the interior thereof, means for operating the rotor, and a speed reducing connection between the last named means and the rotary casing.

3. In combination, a casing rotatably mounted and surrounding an air space the inner wall of the said casing being perforated, a horn in communication with the casing at one extremity, a rotor located within the air space, means for actuating the rotor, a speed reducing connection between the rotor actuating means and the rotary casing and means for interrupting said connection when it is no longer desirable to move the rotary casing.

4. A device of the class described comprising a casing surrounding an air space the said casing being rotatably mounted and provided with sound transmitting means, a rotor located within the air space, means for actuating the rotor, and a speed reducing connection between the rotor actuating means and the rotary casing.

5. A device of the class described comprising a casing rotatably mounted, the said casing surrounding an air space, in communication with the latter and provided with a horn, a rotor located within the air space, means for actuating the rotor and a speed reducing connection between the rotor actuating means and the rotary casing.

6. A siren comprising a rotary casing whose inner wall is perforated and surrounds an air space, a horn mounted upon the said casing, a rotor located within the air space, means for actuating the rotor, a speed reducing connection between the rotor actuating means and the rotary casing, means for interrupting said connection, and means for positively locking the rotary casing against movement, substantially as described.

7. A siren comprising a rotary casing whose inner wall is perforated and surrounds an air space, a horn mounted upon the said casing, a rotor located within the air space, a shaft upon which the rotor is made fast, means for imparting a relatively high speed to the rotor through the medium of the said shaft, and a speed reducing gearing connection between the said shaft and the rotary casing.

8. A siren comprising a rotary casing whose inner wall is perforated and surrounds an air space, a horn mounted upon the said casing, a rotor located within the stationary chamber and provided with radially arranged blades whose outer extremities are in close proximity to the perforated wall, a shaft upon which the rotor is mounted, means for imparting relatively high speed to the rotor through the medium of the said shaft, the rotary casing being equipped with a gear extending entirely around the same, a pinion engaging said gear, and a speed-reducing connection between the shaft of the rotor and the pinion, the latter being adjustable to break the connection between the shaft and the gear of the rotary casing, for the purpose set forth.

9. A siren comprising a rotary casing whose inner wall is perforated and surrounds an air space, a horn mounted upon the said casing, a rotor located within the air space, a shaft to which said rotor is secured, the periphery of the rotary casing being equipped with a gear extending entirely around the same, a pinion engaging the gear of the rotary casing, a shaft upon which said pinion is mounted, a speed-reducing gearing connection between the rotor shaft and the shaft of the said pinion, the last named shaft being longitudinally adjustable to disconnect its pinion from the gear of the rotary casing, and a cam engaging the longitudinally adjustable shaft and constructed to actuate the said shaft to disconnect its pinion from the gear of the rotary casing, for the purpose set forth.

In testimony whereof I affix my signature in presence of two witnesses.

CHARLES M. ANDERSON.

Witnesses:
　Maze Kirby,
　A. Ebert O'Brien.